Patented Feb. 20, 1951

2,542,417

UNITED STATES PATENT OFFICE 2,542,417

HEXAMETHYL BENZENE COMPOUNDS

Roger F. Kleinschmidt, Belvidere, N. J., assignor to General Aniline & Film Corporation, New York, N. Y., a corporation of Delaware No Drawing. Application December 10, 1949, Serial No. 132,399

4 Claims. (Cl. 260—611)

This invention relates to an improved process for manufacturing hexamethyl benzene compounds.

Hexamethylolbenzene has been produced from butynediol by various processes, but the yields obtained have been very low.

It is, therefore, an object of the present invention to provide an improved process for the manufacture of hexamethyl benzene compounds.

It is a further object of the present invention to provide an improved process for the manufacture of hexamethyl benzene compounds in high yield.

It is a further object of the present invention to provide an improved process for the manufacture of hexamethylolbenzene.

These and other objects of the present invention are attained by the present process which comprises manufacturing a compound of the general formula:

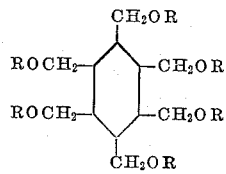

wherein R is selected from the group consisting of hydrogen, alkyl, and acyl groups; which comprises heating in the presence of triphenyl phosphine nickel carbonyl complex catalyst a compound of the general formula:

$$ROCH_2C \equiv C-CH_2OR$$

The reacting compound may be butynediol or the mono- or di-ester or ether thereof formed with acids such as acetic, propionic, butyric, etc. and alcohols such as methyl, ethyl, propyl, butyl, etc.

The reaction is carried out by reflux heating butynediol in the proper anhydrous solvent in the presence of a complex nickel catalyst. The product is a crystalline solid which is insoluble in the reaction mixture. The product may be purified by recrystallization from water.

The catalyst used is a complex formed from triphenyl-phosphine and nickel carbonyl in the molecular ratio of 1:1.

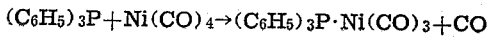

The amount of catalyst used has an important bearing on the yield. In general the amount of catalyst and the yield are somewhat proportional up to the point where secondary reactions set in. Catalyst in the range 3% to 50% by weight of the butynediol or derivative are useful and preferably 40% to 50%.

This catalyst advantageously introduces nickel as a soluble complex and the reaction occurs presumably because of the presence of nickel. In the case of trimerization of propargyl alcohol in benzene solution using this catalyst, the triphenyl phosphine is recovered from the supernatant benzene solution while the nickel is found in the insoluble, viscous trimer. In the case of trimerization of butynediol any insoluble nickel salts (and there are usually only traces) is separated from the product by recrystallization from water.

The solvent used may be any suitable solvent for butynediol and the catalyst. Preferably the solvent used was equal volumes of benzene and absolute methanol. The catalyst is very soluble in benzene, and butynediol, having limited solubility in benzene, is added as a methanol solution, but toluene may be substituted for the benzene and other alcohols may be substituted for the methanol.

The following example illustrates a preferred embodiment of the invention, but variations and substitutions may be made within the scope of the claims.

Example

A solution of 18 parts of triphenyl phosphine nickel carbonyl complex was dissolved in 100 parts of benzene and heated to gentle reflux. To this was rapidly added a solution of 43 parts of 2-butyne-1,4-diol in 100 parts of absolute methanol. There was no apparent immediate reaction and the reaction was heated at reflux for 24 hours. There formed an insoluble crystalline solid, which, when filtered off and air dried, weighed 23.4 parts, or 54.5%.

The product was recrystallized from water, yielding white needles which melted sharply at 302°.

Analysis: Calc. for $C_{12}H_{18}O_6$: C=55.8
H= 6.97

Found: C=55.85
H= 6.68

This hexamethylol benzene is insoluble in most organic solvents, but is soluble in hot water, hot formamide, and hot N,N-dimethylformamide.

I claim:

1. An improved process for manufacturing a compound of the general formula:

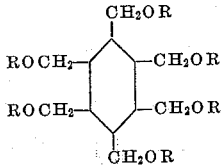

wherein R is selected from the group consisting of hydrogen, alkyl, and acyl groups; which comprises heating in the presence of triphenyl phosphine nickel carbonyl complex catalyst a compound of the general formula:

$$ROCH_2C \equiv C - CH_2OR$$

2. The process of claim 1 wherein the catalyst used is in the range 3 to 50% by weight of the $ROCH_2C \equiv C - CH_2OR$.

3. A process for manufacturing hexamethylolbenzene which comprises refluxing 2-butyne-1,4-diol with a triphenyl phosphine nickel carbonyl complex catalyst in a suitable solvent for both diol and catalyst.

4. Process of claim 3 wherein the catalyst used is in the range 40% to 50% by weight of the diol.

ROGER F. KLEINSCHMIDT.

No references cited.